US008851965B2

(12) United States Patent
Weiss et al.

(10) Patent No.: US 8,851,965 B2

(45) Date of Patent: Oct. 7, 2014

(54) VIDEO GAMING EQUIPMENTS WITH ALTERNATIVE PURCHASABLE BONUS EVENTS

(75) Inventors: Steven Weiss, Henderson, NV (US); David Wright, Las Vegas, NV (US)

(73) Assignee: C2 Gaming LLC, Las Vegas, NV (US)

( * ) Notice: Subject to any disclaimer, the term of this patent is extended or adjusted under 35 U.S.C. 154(b) by 263 days.

(21) Appl. No.: 13/453,728

(22) Filed: Apr. 23, 2012

(65) Prior Publication Data

US 2013/0281170 A1 Oct. 24, 2013

(51) Int. Cl.
*A63F 13/00* (2014.01)

(52) U.S. Cl.
USPC .................... 463/16; 463/17; 463/20; 463/42

(58) Field of Classification Search
USPC .......................................... 463/16, 17, 20, 42
See application file for complete search history.

(56) References Cited

U.S. PATENT DOCUMENTS 5,344,144 A 9/1994 Canon
6,666,766 B2 * 12/2003 Baerlocher et al. ............. 463/16
2005/0250581 A1 * 11/2005 White et al. ..................... 463/42
2006/0084487 A1 * 4/2006 Pierce et al. ..................... 463/16
2007/0026924 A1 2/2007 Taylor
2010/0144419 A1 * 6/2010 Miltenberger et al. ......... 463/17
2010/0203964 A1 8/2010 Berman
2012/0064961 A1 3/2012 Vancura

FOREIGN PATENT DOCUMENTS

WO PCT/SE2006/000559 11/2005
WO WO2006052213 5/2006

* cited by examiner

*Primary Examiner* — James S McClellan

(74) *Attorney, Agent, or Firm* — Mark A. Litman & Associates, P.A.

(57) ABSTRACT

A wagering game is played on processor-based gaming apparatus including:
- providing a gaming apparatus of processor, video display and gaming input system;
- after a wager, the processor executes code to play a first wagering game and display images associated with the first wagering game on the video display;
- when the processor recognizes a predefined trigger outcome, bonus play of a second game different from the first wagering game begins;
- the processor identifies bonus points accumulated during bonus play distinct from any wagering credits;
- the processor displays at least two distinct bonus events of a first bonus event played on the first wagering game and a second bonus event played on the first wagering game. The first bonus event and the second bonus event being activated by the processor diminishing accumulated bonus points. An amount of bonus points needed to activate the first bonus event is different from an amount of points needed to activate the second bonus event.

10 Claims, 5 Drawing Sheets

VIDEO GAMING EQUIPMENTS WITH ALTERNATIVE PURCHASABLE BONUS EVENTS

BACKGROUND OF THE INVENTION

1. Field of the Invention

The present invention relates to the field of gaming, particularly machine based gaming such as slot machines and video gaming machines, and more particularly to gaming machines having bonus events.

2. Background of the Art

Gaming devices typically include an array of mechanical elements on which wagers can be placed. The most common gaming device is the slot machine. This is a device that allows wagers to be entered in a mechanical or electromechanical machine, and the machine generates a random or pseudo-random outcome producing, for example, sets of symbols. These sets of symbols are usually displayed in columns and rows. Predetermined sets or collections or sequences of the symbols within the columns or rows are defined as winning outcomes, and other sets are therefore losing outcomes. Originally slot machines were mechanical devices employing 3 physical reels with various symbols displayed on the reels. After placing a wager, the reels were put into motion and randomly stopped. Wagers were paid depending upon the outcome of the types and positions of symbols.

Gaming machines, such as the standard slot machines have evolved, particularly with the advent of computer technology, which has enabled far greater variety in game play and additional features. Most present day machines are processor driven and have video display monitors. The processor based systems allow for not only a better visual appearance, but significant variation in the underlying games, the ordering of play lines, side bet games, bonus games, and complex wagers and games that are automatically processed. Rather than the earliest three-reel slot machines with a single pay line, a single machine may play one hundred (100) or more games at a single time, and even have multiple games with 10, 20 30 or more separate pay lines.

Typical random frame symbol video slots have, for example, three rows and five columns of available frames within which symbols are randomly provided. The pay lines may be horizontal, vertical, diagonal or non-liner (e.g., zig-zag) and random symbols of special types may be used for what is known as a scatter pay, where the appearance of a certain number of symbols anywhere on the screen is determined to be a winning event.

Second screen, top box, bonus and other special features have become desirable to add variety and the potential for larger awards to the game. The addition of progressive jackpots, in which a portion of a wager from one or more machines builds up in a pot or jackpot, and that jackpot is awarded on an infrequent event, have also become popular. The use of the computer, processor, interconnectivity and video displays have greatly advanced the use of such systems.

Lower denomination games (e.g., $0.01 unit wagers, $0.05 unit wagers) have become very popular. By providing large numbers of pay lines and large numbers (e.g., up to 100× units per pay line), significant revenue can still be generated from small denomination unit wagers.

Although the term reel mapping refers to the distribution and proportions and frequency of images on physical reels, electronic systems perform a similar function to provide random outcomes from the virtual or video reels. This can be done by random number generators, which can be weighted to vary the probabilistic frequency of individual symbols. For example, if there are twelve different symbols that can theoretically be possible on a single column (a single virtual reel), the random number generator may have 1000 available numbers that are randomly selected. Symbol 1 may have 250 out of the 1000 numbers, and therefore have a probability of occurrence of 250/1000. That symbol would likely be a low value or likely losing symbol or a blank space. Symbol 2 might have 150 numbers assigned to that symbol, so that it would appear 150/1000 spins. That symbol would also likely have a low potential value in gaming outcomes, such as a lemon in traditional slot symbol events. Symbol 3 also might have 150 numbers assigned to that symbol, so that it would appear 150/1000 spins. That symbol would also likely have a low potential value in gaming outcomes, such as a plum in traditional slot symbol events. This distribution has already used up more than half of the available numbers from the random number generator (550/1000). More valuable or potentially valuable symbols will have fewer numbers assigned to them, so that the random number generator will select those more valuable symbols less frequently on a long term event basis. Each reel may be separately weighted. For example, a maximum jackpot symbol that requires five matching symbols in a horizontal row may be weighted so that there are 4/1000 numbers assigned in the first column, 3/1000 numbers in the second column 8/1000 numbers in the third column, 20/1000 in the fourth column, and 1/1000 in the fifth column. If the same numbers were assigned to each symbol in each column, there would be less control over the frequency of the final output.

The term “reel” as traditionally referencing a physical reel in a slot machine, is still a convenient term to reference event outcomes, whether the reel event outcomes being referred to are individual frame outcomes (e.g., a single symbol), individual column outcomes (e.g., the locus of frames that would normally appear on a single physical reel) o, column outcomes (where adjacent reel symbols are sequential and horizontal or game outcomes where all available symbol-holding positions have symbols or blank spaces assigned to them.

Bonus events may take many different forms. The bonus events may be triggered or randomly occur. Bonuses may be separate games, increased awards on games similar to the underlying game being played, selection games (e.g., pick and reveal), or random event outcomes run by the processor.

Published U.S. Patent Application Document No. 20070026924 (which claims priority from U.S. Provisional Application Ser. No. 60/702,305 filed on Jul. 23, 2005) describes a gaming device comprising: at least one symbol display that includes at least one award symbols, said award symbol associated with at least one award; a plurality of prize indicators, wherein each has an associated number of awards needed to access said prize indicator, and each of said prize indicators includes at least one prize; a processor operable with said symbol display to generate the award symbols and to enable the player to selectively access at least one prize. Many different variations and alternatives are described therein relating to bonus games.

Published U.S. Patent Application Document No. 20120064961 (Ventura) shows a video and physical gaming system in which a method of playing a game and a gaming device is configured to present a game, a plurality of reels display a base set of symbols. The symbols are used to define a base game outcome. In the event a nudge feature is triggered, such as by receipt of trigger symbols in the base game, reels having associated trigger symbols are locked and individual ones of the reels are nudged to new positions, wherein after a particular reel has been nudged, a new game outcome is evaluated. The reels may be nudged sequentially. Other triggers, such as receipt of additional numbers of trigger symbols, may also trigger a primary bonus game, which bonus game may further trigger one or more secondary bonus games.

Published U.S. Patent Application Document No. 201000203964 (Berman) describes a system and method for allowing gaming device participants to effect trades of player assets for improved odds of attaining gaming bonus events. A player engages in play of a gaming activity, such as a slot game, which includes a standard mode of play and a bonus mode of play. Player assets are traded for an increased probability of attaining a bonus event associated with the bonus mode. A trade amount is surrendered by the player as part of the trade, and the probability of the player attaining the bonus event increased, thereby allowing the player to engage in bonus activity sooner, more frequently, or when otherwise less available to the player. U.S. Pat. No. 5,344,144 (Canon) describes an accumulator for a multiple jackpot gaming system wherein the accumulator has the facility for date stamping jackpot-wins, recording the identification of devices and changes being made by such devices to its data and/or programming, allocating coins-in to one or more jackpot groups and/or to one or more increment rates assigned to a particular jackpot group, operate its jackpot stack so as to clear stack positions immediately upon clearing a jackpot, and control jackpot handling from its main programming loop.

All references cited herein are incorporated by reference in their entirety.

SUMMARY OF THE INVENTION

A method of playing and an apparatus for playing a wagering game on gaming apparatus has steps including:

- providing a gaming apparatus comprising a) a processor, b) a video display or mechanical reel system and c) gaming input system;
- the processor recognizing a wager at the gaming input system;
- the processor executing code to play a first wagering game and display images (virtual or reel images) associated with the first wagering game on the video display;
- the images on the video display comprising symbols;
- when the processor recognizes a predefined set of symbols, the processor executes code to enter bonus play of a second game different from the first wagering game;
- the processor identifies bonus points accumulated during bonus play and displays a total of bonus points distinct from any wagering credits displayed by the processor on the gaming apparatus;
- the processor displays at least two distinct bonus events comprising a first bonus event to be played on the first wagering game and a second bonus event to be played on the first wagering game, the first bonus event and the second bonus event being activated by the processor diminishing accumulated bonus points, wherein an amount of bonus points needed to activate the first bonus event is different from an amount of points needed to activate the second bonus event;
- upon diminishing accumulated points, at least one of the first bonus event and the second bonus event is activated for execution of code by the processor in playing at least one game of the first wagering game.

DETAILED DESCRIPTION OF THE INVENTION

Figure 1:
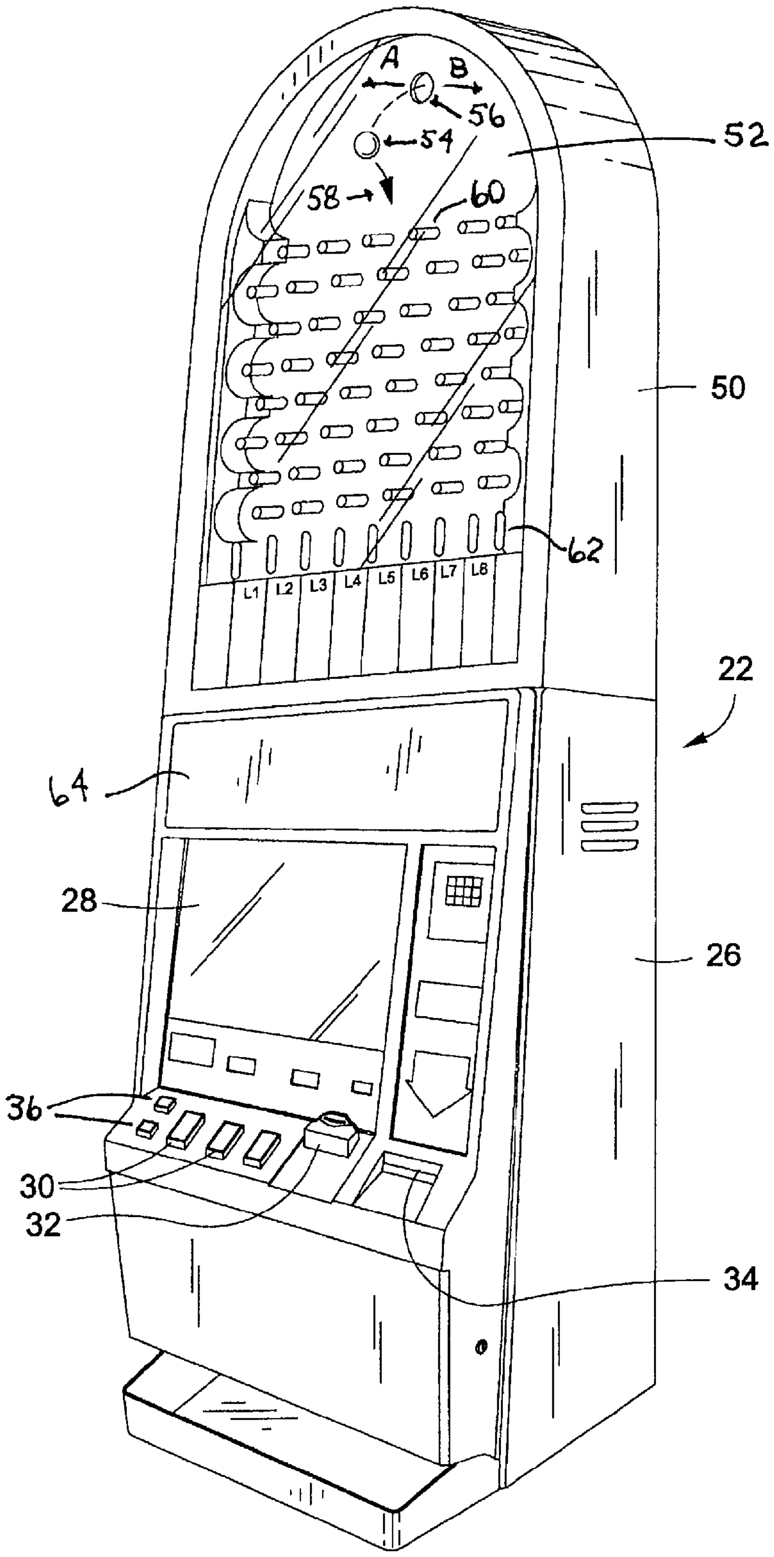
FIG. 1 shows a perspective view of a video gaming system with a top box virtually displaying a pachinko-type ball drop system.

A method of playing and an apparatus for playing a wagering game on gaming apparatus has steps including:

- providing a gaming apparatus comprising a processor, a video display and gaming input system;
- the processor recognizing a wager at the gaming input system;
- the processor executing code to play a first wagering game and display images associated with the first wagering game on the video display;
- the images on the video display comprising symbols;
- when the processor recognizes a predefined set of symbols, the processor executes code to enter bonus play of a second game different from the first wagering game;
- the processor identifies bonus points accumulated during bonus play and displays a total of bonus points distinct from any wagering credits displayed by the processor on the gaming apparatus;
- the processor displays at least two distinct bonus events comprising a first bonus event to be played on the first wagering game and a second bonus event to be played on the first wagering game, the first bonus event and the second bonus event being activated by the processor diminishing accumulated bonus points, wherein an amount of bonus points needed to activate the first bonus event is different from an amount of points needed to activate the second bonus event;
- upon diminishing accumulated points, at least one of the first bonus event and the second bonus event is activated for execution of code by the processor in playing at least one game of the first wagering game.

Additional features of the present technology are described below. It is to be understood that when actions are described in the game that are displays of physical actions (e.g., reels spinning, balls dropping, balls bouncing or deflection, collection into columns or colors of balls), all events are displays of images of virtual events simulating physical events, the images in response to code executed by the processor to determine random events that are displayed in simulation on the video display. For example, a random number generator or other random event selection function associated with and executed by the processor determines a bonus event outcome of 250 bonus points for a single bonus event step. This bonus event outcome is effected on the video display, for example, as a ball being dropped in the fashion of a Pachinko machine, and that ball being dropped into a collection area (e.g., a column) having an individual ball drop value of 250 bonus points. The displayed video image is merely a simulated and virtual display of a single outcome determined by the random number generator selecting from among probable outcomes. All individual event outcomes (e.g., a single ball drop) are determined by random event determination by the processor or a final bonus event total is randomly selected as a template so that all individual event outcomes are provided as a component of the template. For example, a final bonus event outcome of an award of 900 bonus points is selected as a template. Nine virtual balls are virtually dropped in one or more of the various eight (for example) columns. One is dropped in a column valued at 800 points, two in a column valued at 200 points, two in a column valued at 400 points, three are dropped into a column valued at 300 points, and one is dropped into a column valued at 100 points. The minimum number of balls in a single collection area necessary to provide bonus points is three, so the selection of the 900 bonus point outcome has been met by a template (there may be alternative templates) that provides 900 points with 3×300 points resulting from the virtual ball drop template simulation. Given this understanding of the visual effects being simulations of events determined by a processor executing code, a better appreciation of the operation of the present technology can be obtained.

The bonus play can be referred to as the "Anytime Bonus" as once at least the minimum number of bonus points necessary to exercise and option and "buy" a particular bonus, the bonus may be exercised. For example, if each of the three bonuses may be purchased for 15 point/lines, 20 points/line or 30 points/line, respectively, once 15 bonus points have been collected, the first bonus may be purchased at any time. If there are 9 lines, and the wager is 5 units/line, once 675 points have been collected, the first bonus for maximum wagers and 9 lines may be purchased once the 675 credits have been accumulated, leaving 0 bonus points left over. With that number of points accumulated, in the second bonus 9 lines with 3 credits each may be purchased for (9×20×3−540) bonus points leaving 135 bonus points. may be purchased once the 675 credits have been accumulated, leaving 0 bonus points left over. With that number of points accumulated, in the third bonus 9 lines with 2 credits can be purchased for (9×2×30=540) bonus points, leaving 135 bonus points. The bonus points may be converted to actual play credits (value) at any time.

One method of practicing the present technology is as a method of playing a wagering game as described above, wherein the bonus game comprises the processor executing code to simulate a ball drop game in which multiple balls are dropped through a random event path towards multiple columns as collection positions, wherein at least some of the multiple columns represent different numbers of bonus points. This ball drop game may appear to be similar to a Pachinko game in which balls are dropped through a maze or array or arrangement of bumpers to effect random drop events. The processor executes code to randomly select values of bonus points to be collected on a ball drop and simulating an image of a ball dropping into a first column representing the selected value, and displaying on the screen a prospective number of bonus points to be awarded if the minimum number of virtual balls are positioned within the first column. At least a predetermined minimum number of virtual ball drops is simulated. That predetermined minimum number may be, for example, 4, 5, 6, 7, 8, 9 or 10 or more ball drops. Further ball drops beyond this minimum number mat bee simulated as part of the bonus game point determination step if needed, as will be further explained. For example, to assure that at least some bonus points are accumulated by the processor, if no minimum number of drops in a single column occurs, at least one more ball will be dropped, or additional numbers of balls virtually dropped until a minimum number is collected in a single collection area. After the minimum number of ball drops has been simulated by execution of code by the processor, the bonus event terminates if at least one column has the minimum number of virtual balls positioned within the first column. For example, the minimum number of balls necessary to accumulate bonus points may be, for example, three ball in a single column. It is a less preferred option that if no minimum number is reached, no bonus points are awarded. If more than one column has the minimum number of virtual balls positioned within a column, all columns having the minimum number of balls contributes to a total of bonus points accumulated during the bonus event. For example, if there are three balls in the 100 column and four balls in the 200 column, 1100 bonus points will be awarded (3×100 plus 4×200=1100).

In one optional method of play, at least five virtual balls are virtually dropped in the play of the game, and at least one virtual ball has a distinct color that represents an additive or multiplier effect to bonus points in columns into which the distinct color ball is virtually dropped. For example, common balls may be silver, and their impact on bonus points is 1×. With a red ball, the impact on bonus points may be a multiplier, such as 2× or 3× or % x, etc. One colored ball is still a single ball in determining reaching a minimum number of balls in a collection area. A blue ball may be an additive ball such that its impact on bonus points may be (1×+100 bonus points). For example, if the blue ball dropped into the 300 point column, the potential award (if the minimum number of balls is provided in that 300 point column) would be 400 bonus points (100+300).

After a first number of virtual balls have been displayed as virtually dropping into columns by processor initiated drop sequences, at least two additional virtual balls may be available for dropping from a virtually moving platform and virtual dropping of the at least two additional balls is dropped by signal initiated at the input control to simulate skill. All virtual ball drops into columns is predicated upon the execution of a random number generator selecting a bonus point outcome for each virtual ball drop and a visual display is provided by the processor to display a simulated ball drop into a column of matching the selected bonus point outcome.

The color of at least a next virtual ball available for a virtual drop may be displayed on the video display to indicate any additive or multiplier effects of the next ball. Again, if more than the minimum number of balls is collected in the first column, additional bonus points are accumulated as compared to when only the minimum is accumulated. For example, if four balls drop into a 200 bonus point column, the bonus point award may be either 800 (4×200) or may be further bonused by a multiplier effect to reach a total such as 900 (3×200×1.5) or 1200 (3×200×2) or by additive effects to reach 1000 (3×200 plus 400 for the extra ball).

A gaming device useful within the scope of the present invention is shown in FIG. 1. FIG. 1 shows a perspective view of a video gaming system 22 with a top box 50 virtually displaying a pachinko-type ball drop system. The gaming system 22 is also shown with a bottom game section 26 housing the first video screen 28 9 which may preferably be a touch screen), game play inputs and controls 30, 36, a coin or token insert slot 32, a ticket or currency insert slot 34 and a second video display area or screen 64. The first video screen 28 ordinarily displays the underlying game event (such as the 3×5 reel slot game) and the second video display 64 may show special bonus information, such as the various choices available for bonus events using accumulated bonus points. The second video screen 64 may also display accumulated bonus points, costs for each various bonus event to be selected, options in selecting bonus events, processor suggested options for bonus event selections, and other information relating to the base game (the reel slot game) and the bonus event game and accumulated or exercised bonus points.

The top box 50 may be a separate screen, or a part of a continuous video display incorporating first video display 28, second video display 64 and the top box video display 52. Shown in this specific embodiment of the generic game system of the present technology is a display screen 52 displaying a virtual ball ejecting position 56 (which may be moveable in alternative or continual shifts along directions A and B to simulate random movement of a drop position. A ball 54 is shown emitted from the ball ejecting position 56 in a downward direction 58 towards a tortuous pathway defined by bumpers or pegs 60 in a typical Pachinko pathway array. Collection area 62 has multiple columns for collecting virtually dropped balls 54 (L1 L2 L3 L4 L5 L6 L7 L8). Each of the columns is identified on the display screen 52 with different bonus point values, such as 100, 150, 200, 250, 300, etc. As each ball is collected in a drop collection area column, there may be an indication of the present potential value of a particular column attaining the minimum number of collected balls, such as three balls. For example, if column L3 has an indicated value of 300 bonus points, a first dropped ball will have a posted value of 300 for column L3. This may be displayed in video display 52 or 64 or 28. When a second ball falls into column L3, the indicated potential value will be shown as 600 (2×300). This is only a potential value as that column will contribute to accumulated bonus points only when there is the minimum number of balls collected in column L3.

Figure 2:
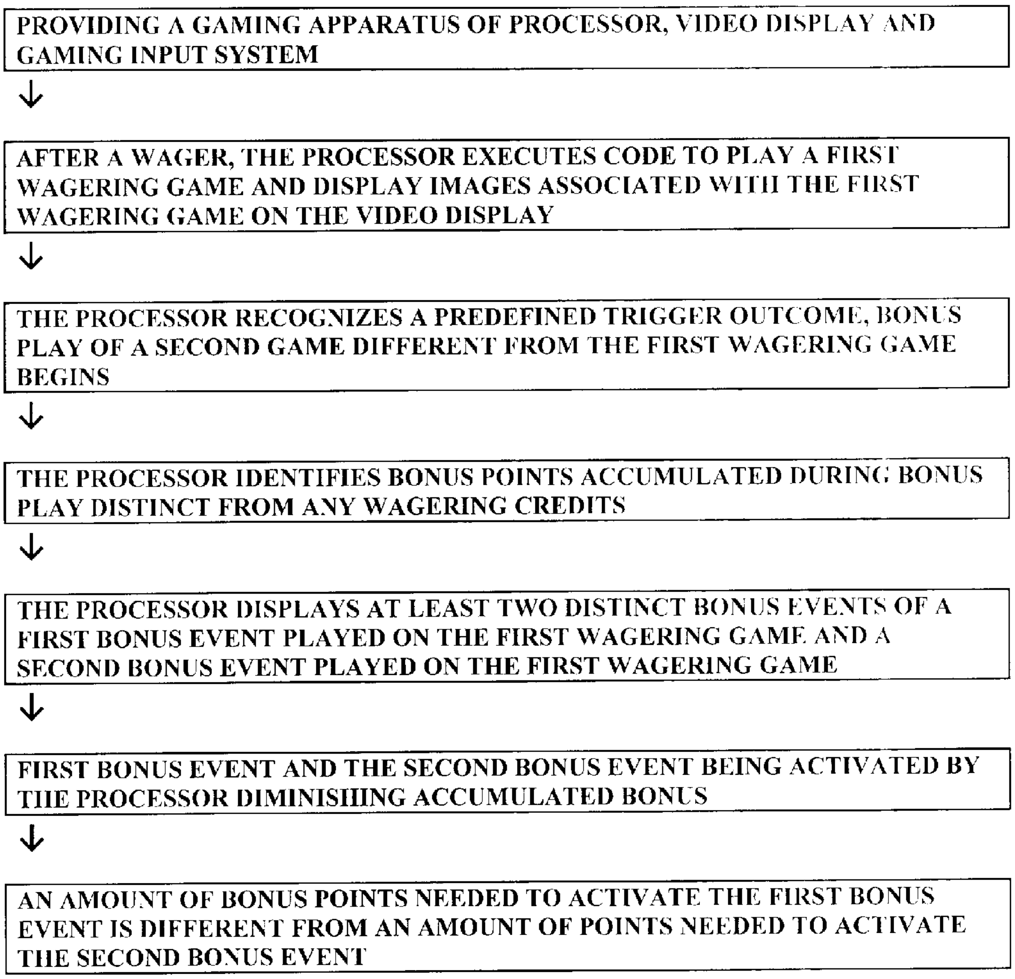
FIG. 2 is a flow diagram of a specific method within the generic concepts of the present invention.
Figure 3:
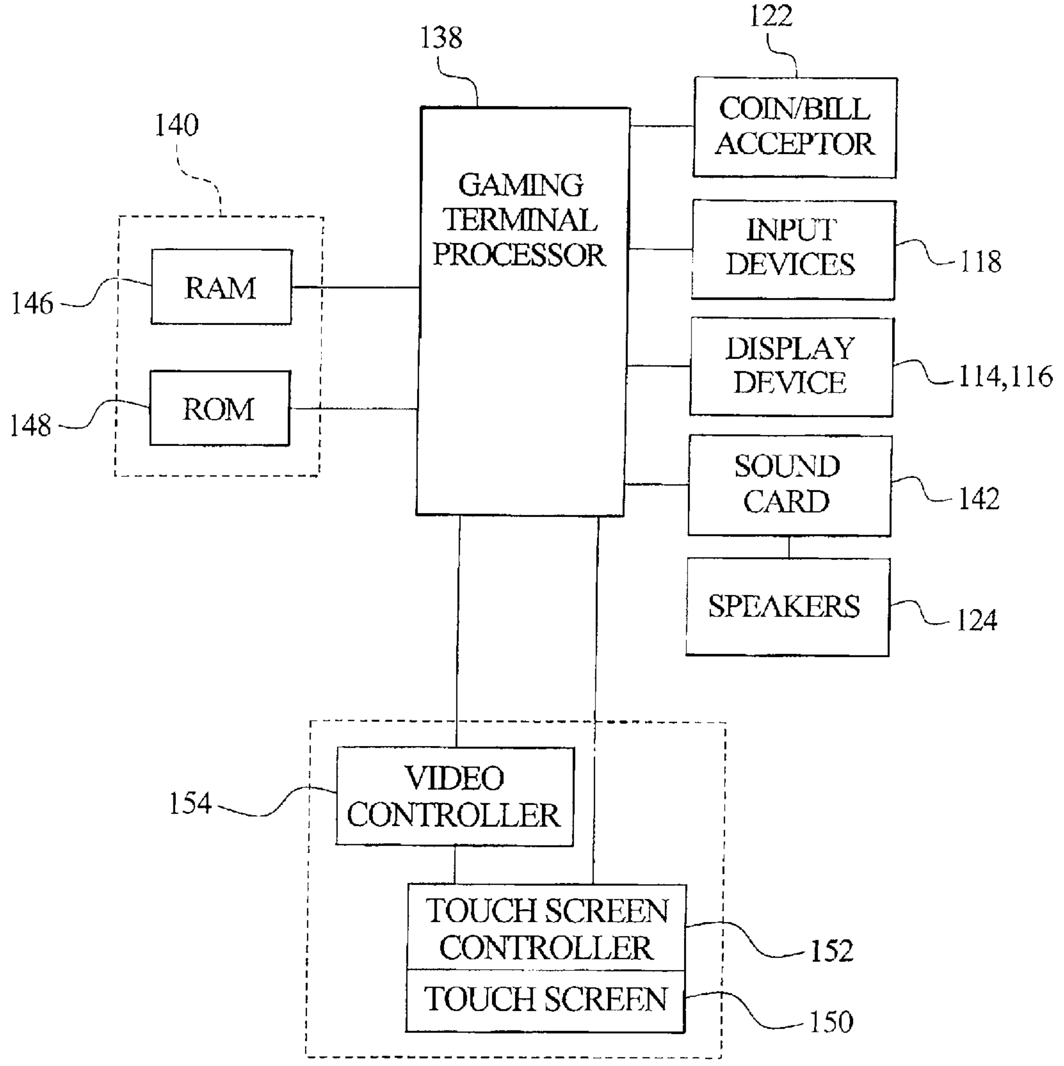
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
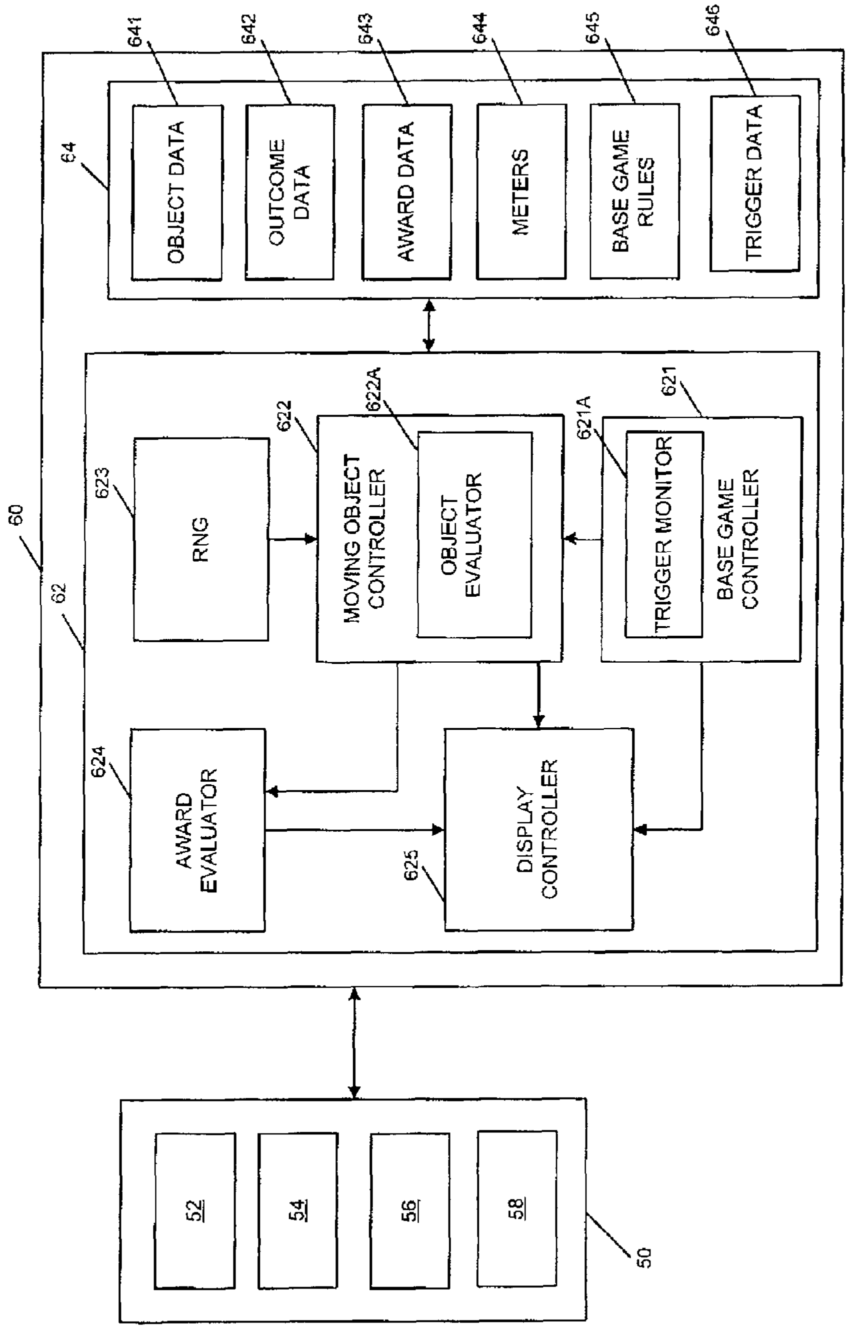
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106, 107, 108, 109, 110, 111 to be provided remotely from the game controller 101.

Figure 5:
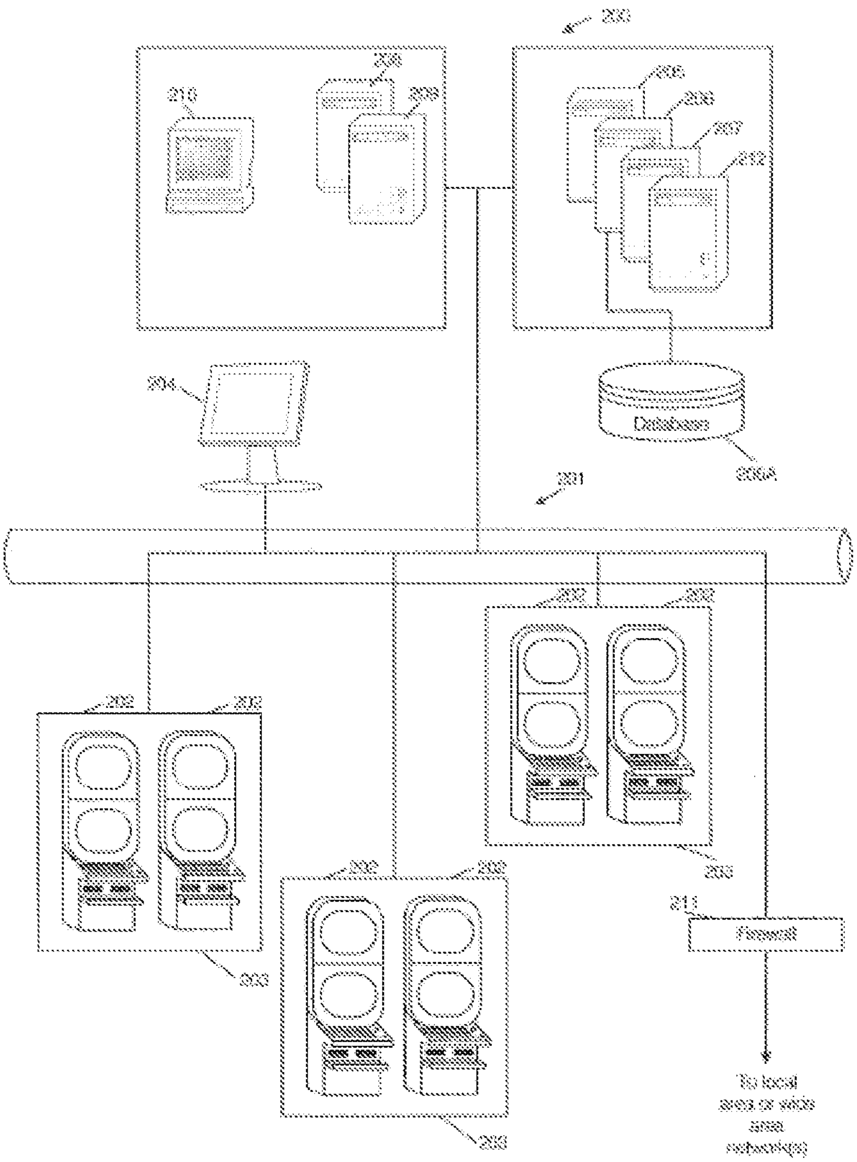
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10, 100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211. Encryption and passwords and client identification are issues within the control of the ordinarily skilled artisan to be built into game access, especially with distal access, as through hand-held devices, the intranet and internet connections.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

The present novel technology provides a different aspect of entertainment to the player, without complicating play. It is important that a player be able to sit down and play a game and understand the game without significant effort. As the games are basically played automatically, with limited player choices, and those choices being clearly and immediately explained, the present game and gaming system is believed to meet the criteria player accessibility.

Players can win and accumulate bonus points that can be used to obtain multiple classes of bonus events. Some or all bonus points may be paid in the form of traditional credits that can be played or cashed out and some or all bonus points can be used to exercise options in the play of various bonus events that are used in play of an underlying video game. The players can accumulate bonus points as long as they wish, and when they anticipate or determine it is an appropriate time to use those bonus points, they may use those bonus points in any manner they see fit. As many players are inclined to "feel" a streak approaching or occurring, players can time the use of their bonus points and feel more in control of events, rather than having bonus events automatically occur without their input.

In one specific embodiments of a game play system within the generic concepts of the invention, the base game or underlying game will be described as a standard 5-reel video slot machine. One improvement in the practice of the present technology is that the bonus points are in numerical units directly relatable to normal credits, so that the value and potential value of the bonus credits can be appreciated, as opposed to collecting "coins," "acorns," or other subtract symbols.

The underlying game is played as a typical video gaming system, and there is a predefined triggering event that occurs and puts the gaming system into the bonus point collection mode. That triggering event may be any type of underlying game event that can occur in the underlying game. Typically, a specific number of bonus symbols (in a scatter pay event or in sequence in a pay line event) can be used as trigger. For example, there may be a special Bonus Event symbol and when five (5) of those symbols appear on a screen after play of a single underlying game, the bonus point collection event is initiated. Standard credits are logged in a meter as is traditional in the art, and the bonus points accumulated are separately stored and identified in a distinct meter.

The player may choose to bet their bonus points on any bonus event at any time, and/or cash in bonus points for ordinary credits, at either a 1:1 trade or discounted trade for normal credits (e.g., 10 bonus points for 1 normal credit). The bonus points may be used to select and initiate any of a number of bonus events, and more than one bonus event must be available for selection. There must be at least two bonus events. It is also preferred that at least two available bonus events be purchasable for different numbers of bonus points.

For example, there may be three available bonus events: 1) a 2× or 3× multiplier for any wins that occur in game play; 2) addition or increase in the number of bonus symbols (especially if some bonus symbols are already available in the game; 3) changing an ordinary game symbol (e.g., a lemon, which ordinarily has no value or benefit potential) into a wild symbol; or 4) changing an ordinary game symbol (e.g., a lemon, which ordinarily has no value or benefit potential) into a more beneficial symbol (e.g., a Bar, Double Bar, Triple Bar, Cherry, etc.). As each of these bonus events has a potentially different frequency and potential size impact on game events during the bonus round play (as distinct from the bonus point collection event), different costs are preferably associated with the different purchases. For example, in a multiline game (e.g., 15 lines) with 10 credits being played per line, purchase of the 2× multiplier game as a bonus event might cost 100 or 150 bonus points. At the same wagering level, adding an additional number of wild symbols might cost 200, 250 or 300 bonus points. At the same wagering level, changing a traditionally valueless symbol (especially all of such symbols) to a wild symbol might cost 500, 600 or 800 bonus points. At the same wagering levl, changing a traditionally valueless symbol (especially all of such symbols) to a more valuable symbol might cost 200, 300 or 400 bonus points.

It is to be noted that in the ball drop version of bonus point accumulations, the different colors of balls do not represent distinct values, but indicate different event outcomes when collected in a single collection are and the minimum number of balls are collected in a single column collection area. All bonus points need not be expended at once, but may used in portions at various times. Different bonus events may be purchased for sequential play, but the bonus events should not be combined. For example, one could not elect the 2× win option, add additional wild symbols, and convert all incidences of an ordinary symbol into a wild symbol at the same time. All bonus points are preferably a uniform class of bonus points. Although different amounts of bonus points may need to be exercised to acquire different optional bonus events, there is only a single class of bonus point.

When in a bonus event, an additional or underlying wager on the game may or may not be required. That is, if a 150 wager (15 pay lines and 10 units per pay line) event is being played in the bonus event, the purchase of the bonus event may or may not require a wager of 150 standard credits. It is to be noted that as wagers may vary (e.g., there may be a 75 credit wager based on 15 pay lines and 5 credits per pay line), the purchase amount of a particular bonus will vary depending upon the underlying wager. The bonus event may be purchased and played at a wagering amount that is different from the standard or average wager amount used by a particular player.

For example, a machine has been operating with consistent 30 units/game wagering and has 1500 bonus points accumulated. In electing a bonus game, it might cost 30 units to elect a 2× event, 45 bonus point units to elect an extra wild card event, 60 bonus points to elect an extra class of symbols as a wild card in a 30 credit underlying game play. If the game were to be switched to a 150/game play wager, the respective elections would be 150, 225 and 300 for the same events at the higher wager level. The purchased election might be all that is needed to begin the bonus game event or an additional wager might be needed. It is possible, to promote higher wagering amounts, that for all bonus games an actual credit wager of the minimum number of units and the maximum number of pay lines (e.g., 15 pay lines and 1 credit per pay line) might be required without regard to the wager amount purchased an elected. For example, whether a 15 credit/wager game is played or a 150 credit/wager game is played in the bonus round, the player would (optionally) be charged 15 actual credits after the purchase price. This would promote larger wagers on the bonus game event, use the bonus points faster, and train players to wager the larger amounts.

It will be readily apparent to one of ordinary skill in the art that the various processes described herein may be implemented by, e.g., appropriately programmed general purpose computers, special purpose computers and computing devices as are used or considered for use with gaming apparatus and especially video gaming apparatus. Typically a processor (e.g., one or more microprocessors, one or more microcontrollers, one or more digital signal processors, mother boards, daughter boards, master-slave systems, and the like) will receive instructions or code (e.g., from a memory or like device), and execute those instructions and/or code, thereby performing one or more processes defined by those instructions. A "processor" means one or more microprocessors, central processing units (CPUs), computing devices, microcontrollers, digital signal processors, or like devices or any combination thereof.

Thus, as explained in greater detail herein, a description of a process is likewise a description of an electronic, processor-driven apparatus for performing the process. The apparatus that performs the process can include, e.g., a processor and those input devices and output devices that are appropriate to perform the process. Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art. Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required or physically performed with physical objects, embodiments of an apparatus include a computer/computing device operable to perform some (but not necessarily all) of the described process. Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel®. Pentium® processor or Centrino™ processor, that are adapted to communicate with the computer. Any number and type of devices may be in communication with the computer.

As noted elsewhere, the underlying base game may be a traditional reel-type system with mechanical reels or virtual reels. Rather than relying on only physical random reels, the modern mechanical reel is controlled by a processor. Individual physical frames are mapped, the processor in a random number generation mode randomly selects a frame position, and that frame position is displayed. The individual frames are often probabilistically weighted so that more valuable symbols are displayed less frequently on some reels than other (e.g., less valuable) symbols.

There are numerous variations falling within the scope of the present invention. Any combination of the above embodiments may be used. This invention may be employed with any combination of options including, but not limited to, other bonus or feature games, lottery games, any skill game or games having a player skill component, side bets, additional bets, different wagering methods, play methods or game rules. Implementation may take any form or utilize any suitable means. This invention may be employed in whole or in part, or itself as a bonus, add-on or otherwise in conjunction with traditional gaming devices or methods. Thus, these and all embodiments described should be viewed as illustrative, rather than limiting.

What is claimed:

1. A method of playing a wagering game on gaming apparatus comprising: providing a gaming apparatus comprising a processor, a display and gaming input system; the processor recognizing a wager at the gaming input system; the processor executing code to play a first wagering game and display images associated with the first wagering game on the display; the images on the display comprising symbols; when the processor recognizes a predefined set of symbols, the processor executes code to enter bonus play of a second game different from the first wagering game; the processor identifies bonus points accumulated during bonus play and displays a total of bonus points distinct from any wagering credits displayed by the processor on the gaming apparatus; the processor displays at least two distinct bonus events comprising a first bonus event to be played on the first wagering game and a second bonus event to be played on the first wagering game, the first bonus event and the second bonus event being activated by the processor diminishing accumulated bonus points, wherein an amount of bonus points needed to activate the first bonus event is different from an amount of points needed to activate the second bonus event; upon diminishing accumulated points, at least one of the first bonus event and the second bonus event is activated for execution of code by the processor in playing at least one game of the first wagering game, wherein the first wagering game comprises a three row by five column set of frames and each frame is provided by random symbol images provided by the processor executing code to provide the random symbol images, wherein the bonus event comprises a virtual game displayed and resolved by the processor executing code to provide an image of multiple collection areas, with images of collectible multiple bonus symbols are provided to deposit themselves one-at-a-time within the collection areas, at least some of the multiple collection areas represent potential bonus points to be awarded when at least one of the collectible multiple bonus symbols is virtually positioned within a specific collection area, wherein at least some of the multiple collections areas represent different numbers of bonus points that are awarded, wherein bonus points are awarded only when at least a minimum number greater than 1 of collectible multiple bonus symbols are virtually positioned within a single collection area, and wherein the at least a minimum number greater than 1 is a minimum number greater than 2.

2. A method of playing a wagering game on gaming apparatus comprising: providing a gaming apparatus comprising a processor, a display and gaming input system; the processor recognizing a wager at the gaming input system; the processor executing code to play a first wagering game and display images associated with the first wagering game on the display; the images on the display comprising symbols; when the processor recognizes a predefined set of symbols, the processor executes code to enter bonus play of a second game different from the first wagering game; the processor identifies bonus points accumulated during bonus play and displays a total of bonus points distinct from any wagering credits displayed by the processor on the gaming apparatus; the processor displays at least two distinct bonus events comprising a first bonus event to be played on the first wagering game and a second bonus event to be played on the first wagering game, the first bonus event and the second bonus event being activated by the processor diminishing accumulated bonus points, wherein an amount of bonus points needed to activate the first bonus event is different from an amount of points needed to activate the second bonus event; upon diminishing accumulated points, at least one of the first bonus event and the second bonus event is activated for execution of code by the processor in playing at least one game of the first wagering game; wherein the bonus game comprises the processor executing code to simulate a visual display on a video display screen of a ball drop game in which multiple virtual balls are dropped through a virtual random event path towards multiple virtual columns as collection positions, wherein at least some of the multiple virtual columns represent different numbers of bonus points wherein the processor executes code to randomly select values of bonus points to be collected on the virtual ball drop and simulating an image of a virtual ball dropping into a first virtual column representing the selected value, and displaying on the video display screen a prospective number of bonus points to be awarded if the minimum number of virtual balls are positioned within the first virtual column.

3. The method of claim 2 wherein at least a predetermined minimum number of virtual ball drops is simulated.

4. The method of claim 3 wherein after the minimum number of ball drops has been simulated by execution of code by the processor, the bonus event terminates if at least one column has the minimum number of virtual balls positioned within the first column.

5. The method of claim 4 wherein if more than one column has the minimum number of virtual balls positioned within a column, all columns having the minimum number of balls contributes to a total of bonus points accumulated during the bonus event.

6. The method of claim 5 wherein at least five virtual balls are virtually dropped in the play of the game, and at least one virtual ball has a distinct color that represents an additive or multiplier effect to bonus points in columns into which the distinct color ball is virtually dropped.

7. The method of claim 6 wherein after a first number of virtual balls have been displayed as virtually dropping into columns by processor initiated drop sequences, at least two additional virtual balls are available for dropping from a virtually moving platform and virtual dropping of the at least two additional balls is dropped by signal initiated at the input control to simulate skill.

8. The method of claim 6 wherein all virtual ball drops into columns is predicated upon the execution of a random number generator selecting a bonus point outcome for each virtual ball drop and a visual display is provided by the processor to display a simulated ball drop into a column of matching the selected bonus point outcome.

9. The method of claim 7 wherein color of at least a next virtual ball available for a virtual drop is displayed on the video display to indicate any additive or multiplier effects of the next ball.

10. The method of claim 3 wherein if more than the minimum number of balls is collected in the first column, additional bonus points are accumulated as compared to when only the minimum is accumulated.

* * * * *